United States Patent
Yu et al.

(10) Patent No.: US 12,334,743 B1
(45) Date of Patent: Jun. 17, 2025

(54) POWER CONVERSION SYSTEM (PCS) PARALLEL ARCHITECTURE AND SYNCHRONIZATION CONTROL METHOD THEREOF

(71) Applicant: INDUSTRIAL TECHNOLOGY RESEARCH INSTITUTE, Hsinchu (TW)

(72) Inventors: Ming-Hung Yu, Zhudong Township (TW); Pao-Chuan Lin, Zhubei (TW); Wan-Pei Chen, Hsinchu (TW); Kuan-Wen Chen, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 19 days.

(21) Appl. No.: 18/396,402

(22) Filed: Dec. 26, 2023

(30) Foreign Application Priority Data

Dec. 15, 2023 (TW) ................................. 112149020

(51) Int. Cl.
*H02J 3/32* (2006.01)
*H02J 3/38* (2006.01)
*H02J 3/44* (2006.01)

(52) U.S. Cl.
CPC ..................................... *H02J 3/44* (2013.01); *H02J 3/32* (2013.01); *H02J 3/381* (2013.01)

(58) Field of Classification Search
CPC ........ H02J 3/44; H02J 3/32; H02J 3/38; H02J 3/381
See application file for complete search history.

(56) References Cited

U.S. PATENT DOCUMENTS

| 7,667,351 | B2 | 2/2010 | Marwali et al. |
| 10,020,655 | B2 | 7/2018 | Gao et al. |
| 10,992,230 | B1 | 4/2021 | Arcudia |
| 2015/0016159 | A1 | 1/2015 | Deboy |

FOREIGN PATENT DOCUMENTS

| CN | 201699529 U | 1/2011 |
| CN | 103219904 B | 12/2014 |
| CN | 102904517 B | 4/2015 |
| CN | 112260299 A | 1/2021 |
| CN | 110971557 B | 5/2023 |

(Continued)

OTHER PUBLICATIONS

Albugeri et al., "Control System for Multi-Inverter Parallel Operation in Uninterruptible Power Systems", (11 pages total).

(Continued)

*Primary Examiner* — Robert L Deberadinis
(74) *Attorney, Agent, or Firm* — Birch, Stewart, Kolasch & Birch, LLP (57) ABSTRACT

The application discloses a power conversion system (PCS) parallel architecture and a synchronous control method. Among a plurality of corresponding PCS controllers of the PCS parallel architecture, when a target PCS controller is the first to issue a synchronization signal on a synchronization signal bus, the target PCS controller obtains control authority, the synchronization signal issued by the target PCS controller is taken as a system synchronization signal, and other PCS controllers that did not obtain control authority refer to the system synchronization signal for synchronizing with the system synchronization signal.

18 Claims, 8 Drawing Sheets

(56) References Cited

FOREIGN PATENT DOCUMENTS

| | | |
|---|---|---|
| TW | 201206008 A1 | 2/2012 |
| TW | I524617 B | 3/2016 |
| TW | 202301791 A | 1/2023 |
| WO | WO 2015/196214 A1 | 12/2015 |

OTHER PUBLICATIONS

Jappe et al., "Control Strategy for Three-Phase Four-Wire PWM VSI Parallel Connected in UPS Applications", IEEE, Apr. 2, 2024, pp. 443-448.

Lazzarin et al., "DSP-Based Control for Parallelism of Three-Phase Voltage Source Inverter", IEEE Transactions on Industrial Informatics, vol. 9, No. 2, May 2013, pp. 749-759.

Wei et al., "Distributed Average Integral Secondary Control for Modular UPS Systems-Based Microgrids", IEEE Transactions on Power Electronics, vol. 34, No. 7, Jul. 2019, pp. 6922-6936.

Taiwanese Office Action and Search Report for Taiwanese Application No. 112149020, dated Sep. 9, 2024.

POWER CONVERSION SYSTEM (PCS) PARALLEL ARCHITECTURE AND SYNCHRONIZATION CONTROL METHOD THEREOF

This application claims the benefit of Taiwan application Serial No. 112149020, filed Dec. 15, 2023, the subject matter of which is incorporated herein by references.

TECHNICAL FIELD

The disclosure relates in general to a power conversion system (PCS) parallel architecture and a synchronization control method thereof.

BACKGROUND

In response to the challenge of energy security and net zero carbon emissions, many countries are engaged in the research and development and application of renewable energy. Taiwanese energy policy aims to achieve the following goals by 2025: the capacity of renewable energy device reaches 27GW, and renewable energy amounts to 20% of power generation.

However, along with the popularity of renewable energy, the influence of intermittent power generation on power grids is ever increasing, and conventional power systems are facing persistent challenges. In response to such situation, the power companies worldwide need to introduce new technology to assure a stable power supply.

Battery energy storage is one among most commonly used energy storage systems. Through the charging/discharging control of energy storage battery, the power conversion system (PCS) can implement the stability of power grids. To increase the flexibility of the energy storage systems, the mainstream products on the market are PCSs allowing parallel expansion.

In response to the field of high-power renewable energy combined network, multiple PCSs can be arranged in the same area. According to the generally known technology, multiple modules can be connected in series or parallel through modular stackable power conversion technology to increase the flexibility of system voltage and capacity, and renewable energy systems with different voltage levels and application requirements can be quickly incorporated.

However, when multiple PCSs are connected in parallel, the output of PWM signal and the locking of mains power phase performed by individual PCS may result in signal output error and further cause the problems of circular current, oscillation and control instability.

To resolve the above problems, the application provides a phase/pulse synchronization control method for a power conversion system parallel architecture. The application enables the pulse width modulation (PWM) signals of multiple PCSs to be synchronized with the (AC) mains power signal, so that the output of each PCS can be synchronized and system stability can be increased.

SUMMARY

The present invention relates to a power conversion system (PCS) parallel architecture. With respect to the architecture composed of a number of PCSs operating in parallel, a phase/pulse synchronization control method is provided. The phase/pulse synchronization control method enables the pulse width modulation (PWM) signal provided by the PCSs to be synchronized with the AC mains power signal and assures output synchronization for the PCSs. The application resolves the problems arising from the circular current and interference in the system and significantly increases system stability.

According to one embodiment, a power conversion system (PCS) parallel architecture is provided. The power conversion system (PCS) parallel architecture comprises: a plurality of PCSs electrically coupled to each other through a synchronization signal bus to achieve synchronization, the PCSs further individually coupled to an AC mains power and a DC power supply, respectively; wherein each of the PCSs comprises a PCS controller, among the PCS controllers, when a target PCS controller of the PCS controllers transmits a synchronization signal earliest on the synchronization signal bus to obtain master control, the synchronization signal transmitted from the target PCS controller having the master control is used as a system synchronization signal, and other PCS controllers not having the master control are synchronized with the system synchronization signal by referring to the system synchronization signal.

According to another embodiment, a synchronization control method of a power conversion system (PCS) parallel architecture is provided. The PCS parallel architecture comprises a plurality of PCSs electrically coupled to each other through a synchronization signal bus to achieve synchronization, each of the PCSs comprises a PCS controller used to execute the synchronization control method: among the PCS controllers, when a target PCS controller of the PCS controllers transmits a synchronization signal earliest on the synchronization signal bus to obtain master control, the synchronization signal transmitted from the target PCS controller having the master control is used as a system synchronization signal, and other PCS controllers not having the master control are synchronized with the system synchronization signal by referring to the system synchronization signal.

The above and other aspects of the invention will become better understood with regard to the following detailed description of the preferred but non-limiting embodiment(s). The following description is made with reference to the accompanying drawings.

DETAILED DESCRIPTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

The application discloses a power conversion system (PCS) parallel architecture and a relevant synchronization control method to resolve the problems of circular current, oscillation and uncontrollability of the system caused by the phase and/or pulse asynchronization between the PWM output signal of individual PCS and the AC mains power signal.

The PCS parallel architecture according to an embodiment of the application can perform phase/pulse synchronization control. In a PCS parallel architecture, the multi-modular synchronization control module of the PCS controller of the parallel PCSs can transmit a phase/pulse synchronization signal on the synchronization signal bus, and the PCS issuing the earliest phase/pulse synchronization signal is taken as a reference source of phase/pulse synchronization for other PCSs. The systems, modules and units exemplified in each embodiment of the application are physical circuits capable of implementing synchronization control by way of firmware in cooperation with software programs.

Figure 1:
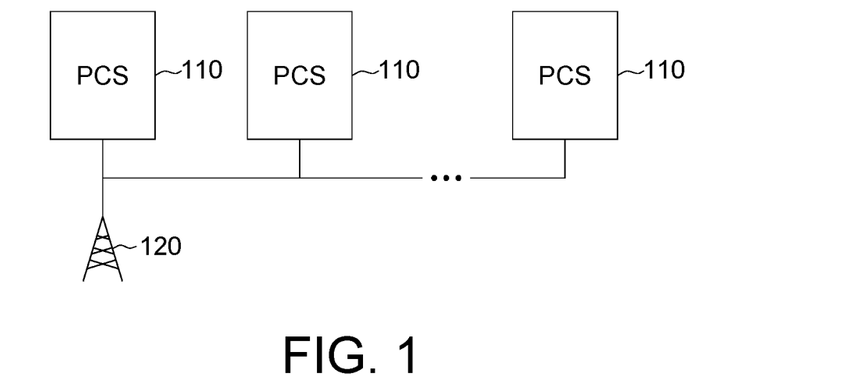
FIG. 1 is a schematic diagram of a PCS parallel architecture according to an embodiment of the application.

FIG. 1 is a schematic diagram of a PCS parallel architecture according to an embodiment of the application. The PCS parallel architecture 100 includes a number of parallel PCSs 110, which are further coupled to a mains power 120. The mains power 120 is an AC mains power. By way of the said configuration, the PCS parallel architecture 100 can control energy absorption and output of power grids.

Figure 2:
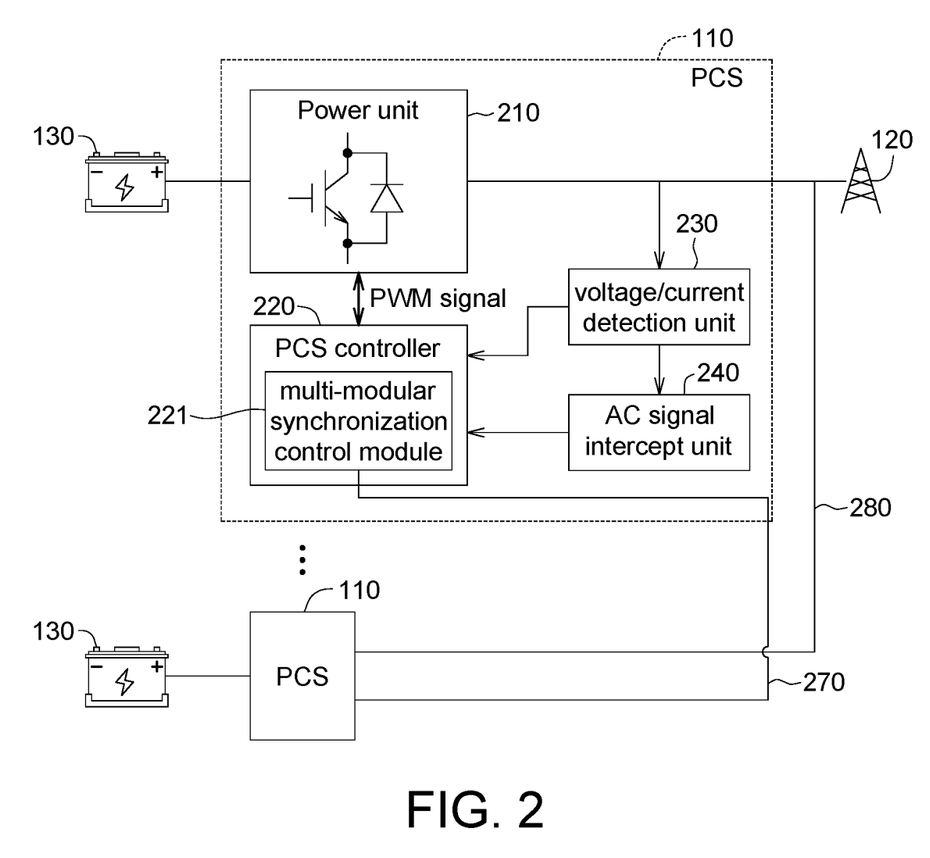
FIG. 2 is a functional block diagram of a PCS parallel architecture according to an embodiment of the application.

FIG. 2 is a functional block diagram of a PCS parallel architecture according to an embodiment of the application. The PCSs 110 are further coupled to a DC power supply 130, wherein the DC power supply 130 can be realized by an energy storage battery. The PCSs 110 are electrically coupled to each other and connected in parallel through a synchronization signal bus 270. Besides, the PCSs 110 are further coupled to the mains power 120 (or AC electronic equipment) through a power line 280.

Each of the PCSs 110 includes a power unit 210, a PCS controller 220, a voltage/current detection unit 230, and an AC signal intercept unit 240. The PCS controller 220 includes a multi-modular synchronization control module 221 and other elements (not illustrated).

The power unit 210 includes semiconductor switch elements.

The PCS controller 220 can be implemented by way of hardware circuits in cooperation with software programs. Exemplarily but not restrictively, the PCS controller 220 can be realized by a field programmable gate array (FPGA) or a micro control unit (MCU).

The PCS controller 220 extracts parameters from the voltage/current detection unit 230, then captures (or extracts) a frequency signal of the AC mains power 120 through the AC signal intercept unit 240 to implement phase synchronization with the mains power.

Then, the PCS controller 220 compares the current signal intercepted by the voltage/current detection unit 230 with the predetermined reference current, then provides a pulse signal to the power unit 210 composed of semiconductor switch elements to implement AC/DC energy conversion and power regulation.

According to generally known technology, when a number of PCSs operate in parallel, phase/pulse asynchronization between the PWM output signal of each PCS and the AC mains power may cause circular current, oscillation or even uncontrollability to the system.

In an embodiment of the application, to assure the stability of the PCS parallel architecture 100, all PCSs 110 are connected together through the synchronization signal bus 270 and phase/pulse synchronization control is performed by the multi-modular synchronization control module 221 of the PCS controller 220, so that the output of all PCSs 110 can be synchronized.

In an embodiment of the application, synchronization control can be implemented by a double line synchronization signal bus. In another embodiment of the application, synchronization control can be implemented by a single line synchronization signal bus. Details are disclosed below.

Figure 3:
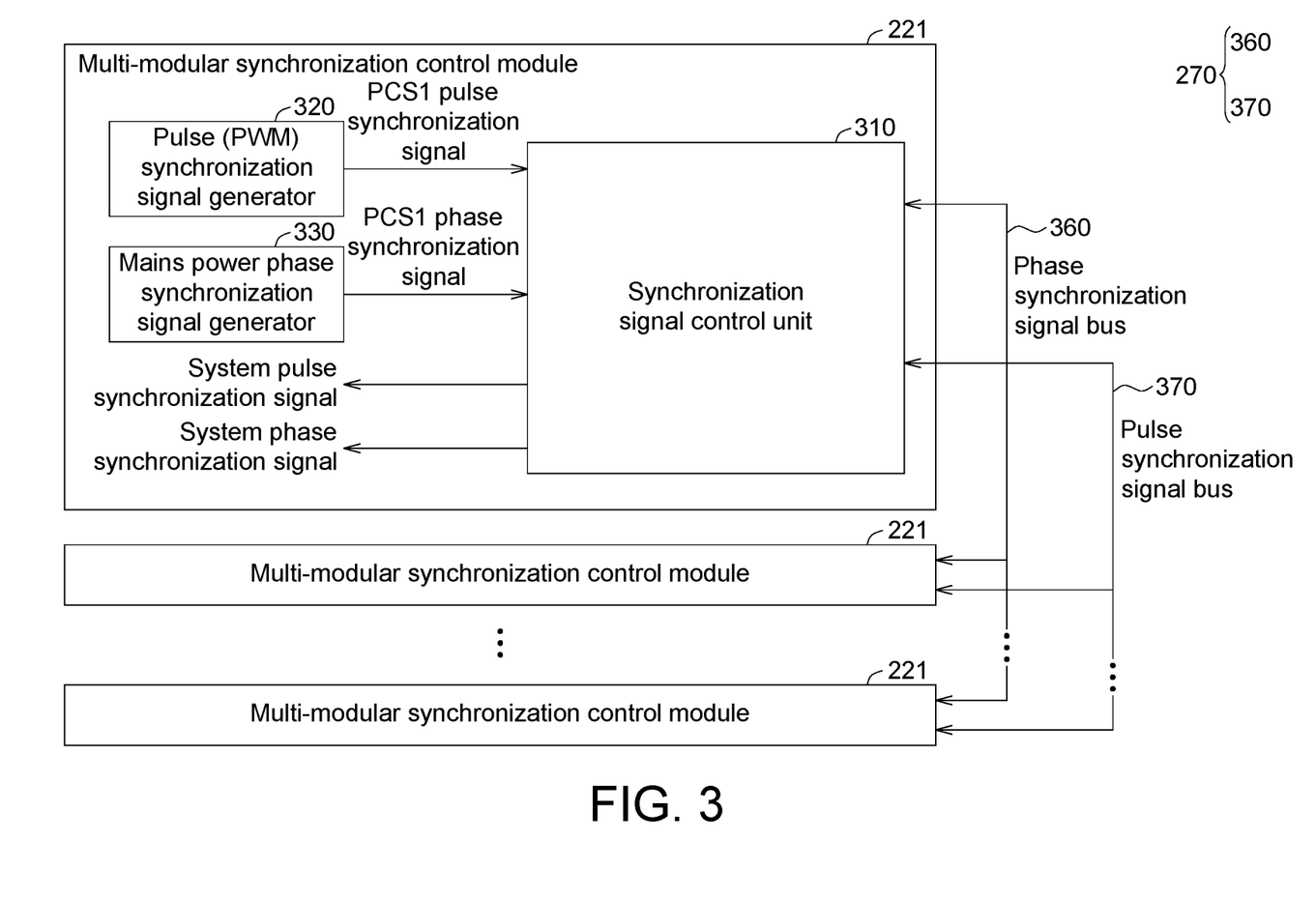
FIG. 3 is a schematic diagram of synchronization control implemented through a double line synchronization signal bus according to an embodiment of the application.

FIG. 3 is a schematic diagram of synchronization control implemented through a double line synchronization signal bus according to an embodiment of the application. The multi-modular synchronization control module 221 according to an embodiment of the application includes a synchronization signal control unit 310, a pulse (PWM) synchronization signal generator 320 and a mains power phase synchronization signal generator 330.

The multi-modular synchronization control modules 221 are coupled to and communicate with each other through a phase synchronization signal bus 360 and a pulse synchronization signal bus 370. That is, the synchronization signal bus 270 includes a phase synchronization signal bus 360 and a pulse synchronization signal bus 370.

The multi-modular synchronization control module 221 generates and processes a synchronization control signal to implement the synchronization of phase/pulse signal between a number of PCSs 110.

The phase synchronization signal bus 360 and the pulse synchronization signal bus 370 connect all multi-modular synchronization control modules 221 of all PCS controllers 220. The phase synchronization signal bus 360 and the pulse synchronization signal bus 370 are respectively used to transmit and receive a phase synchronization signal and a pulse synchronization signal. In a multi-modular synchronization control module 221, the synchronization signal control unit 310, the pulse synchronization signal generator 320 and the mains power phase synchronization signal generator 330 are used to transmit/receive a phase synchronization signal and a pulse synchronization signal and perform the locking of the phase/pulse synchronization signal. The pulse synchronization signal generator 320 is used to calculate the pulse synchronization signal. The mains power phase synchronization signal generator 330 is used to calculate the mains power phase synchronization signal.

Figure 4:
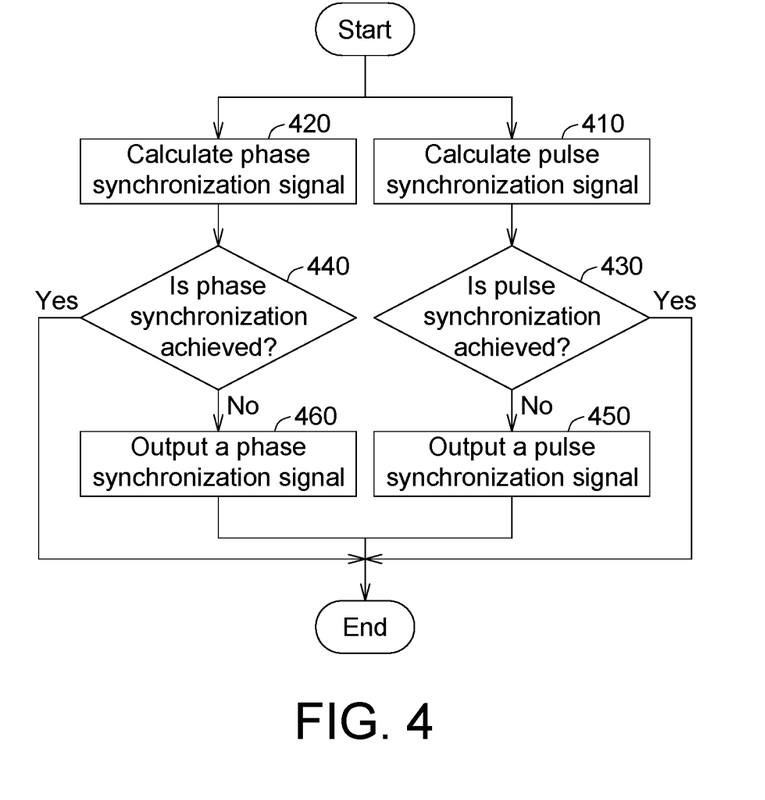
FIG. 4 is an operational flowchart of a multi-modular synchronization control module according to an embodiment of the application.

FIG. 4 is an operational flowchart of a multi-modular synchronization control module according to an embodiment of the application.

As indicated in FIG. 4, in a multi-modular synchronization control module 221, the pulse synchronization signal generator 320 and the mains power phase synchronization signal generator 330 respectively calculate a pulse synchronization command and a phase synchronization command (referring to steps 410 and 420). The synchronization signal control unit 310 determines whether phase priority and/or pulse priority have been occupied by the output of the multi-modular synchronization control modules 221 of other PCSs 110. Before the self-pulse synchronization signal generator 320 outputs a pulse synchronization signal, if the pulse synchronization signal bus 370 has already received and locked pulse synchronization, then the synchronization signal control unit 310 determines that pulse synchronization has been achieved (referring to step 430), and the flow terminates. Before the pulse synchronization signal generator 320 outputs the pulse synchronization signal, if no other signals are transmitted to the synchronization signal control unit 310 through the pulse synchronization signal bus 370 and are locked, the synchronization signal control unit 310 determines that pulse synchronization is not locked. Meanwhile, the synchronization signal control unit 310 locks the pulse synchronization signal generated by itself as a system pulse synchronization signal, uses the pulse synchronization signal as a benchmark of pulse synchronization and outputs the pulse synchronization signal to the pulse synchronization signal bus 370 (referring to step 450), then the process terminates.

The operation principles of phase synchronization are the same as that of pulse synchronization. Before the mains power phase synchronization signal generator 330 outputs a phase synchronization signal, if the phase synchronization signal bus 360 has already received and locked phase synchronization, the synchronization signal control unit 310 determines that phase synchronization has been achieved (step 440), and the action terminates. Before the mains power phase synchronization signal generator 330 outputs the phase synchronization signal, if no other signals are transmitted to the synchronization signal control unit 310 through the phase synchronization signal bus 360 and are locked, the synchronization signal control unit 310 determines that phase synchronization is not locked. Meanwhile, the synchronization signal control unit 310 locks the pulse synchronization signal generated by itself as a system phase synchronization signal, uses the phase synchronization signal as a benchmark of phase synchronization and outputs the pulse synchronization signal to the phase synchronization signal bus 360 (referring to step 460), then the process terminates.

Figure 5:
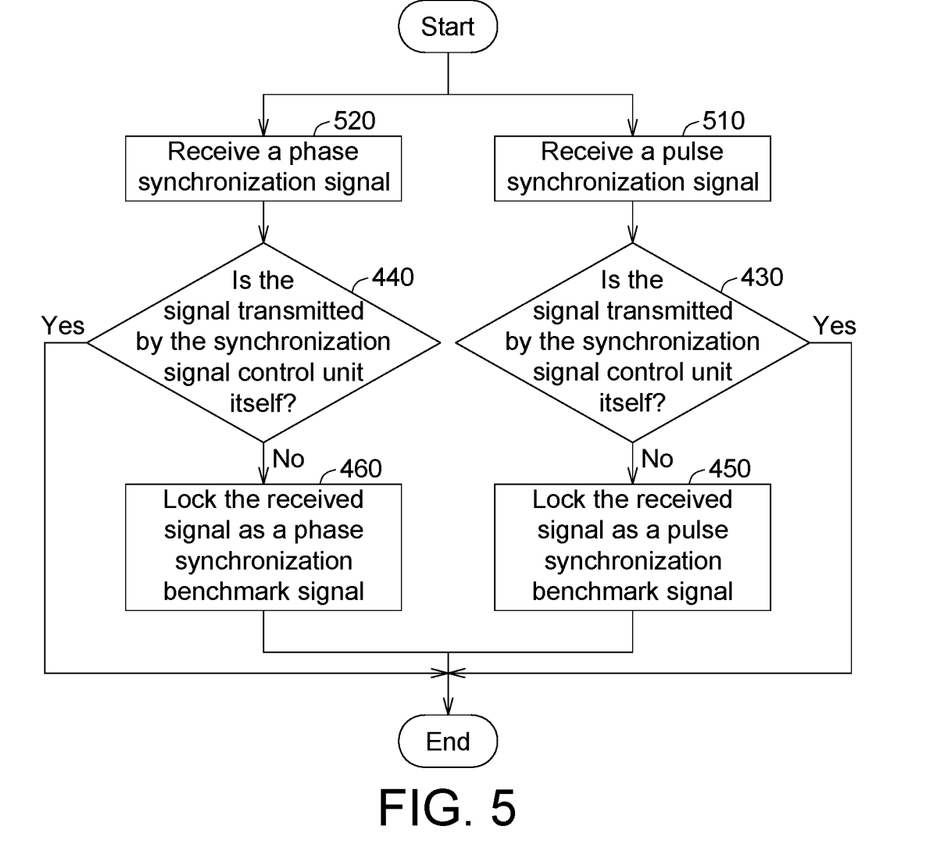
FIG. 5 is a synchronization determination flowchart of a synchronization signal control unit according to an embodiment of the application.

FIG. 5 is a synchronization determination flowchart of a synchronization signal control unit 310 according to an embodiment of the application. When the pulse synchronization signal bus 370 receives a pulse synchronization signal (step 510), the synchronization signal control unit 310 firstly determines whether the received pulse synchronization signal is transmitted by itself (step 530). If the determination in step 530 affirmative, the synchronization signal control unit 310 does not perform any action. If the determination in step 530 is negative, the synchronization signal control unit 310 locks the received pulse synchronization signal as a pulse synchronization benchmark signal (step 550) and transmits a pulse signal locked mark, which indicates that the pulse of the synchronization signal control unit 310 has been locked.

Similarly, when the phase synchronization signal bus 360 receives a phase synchronization signal (step 520), the synchronization signal control unit 310 firstly determines whether the received phase synchronization signal is transmitted by itself (step 540). If the determination in step 540 is affirmative, the synchronization signal control unit 310 does not perform any action. If the determination in step 540 is negative, the synchronization signal control unit 310 locks the received phase synchronization signal as a phase synchronization benchmark signal (step 560) and transmits a phase signal locked mark, which indicates that the phase of the synchronization signal control unit 310 has been locked.

Figure 6:
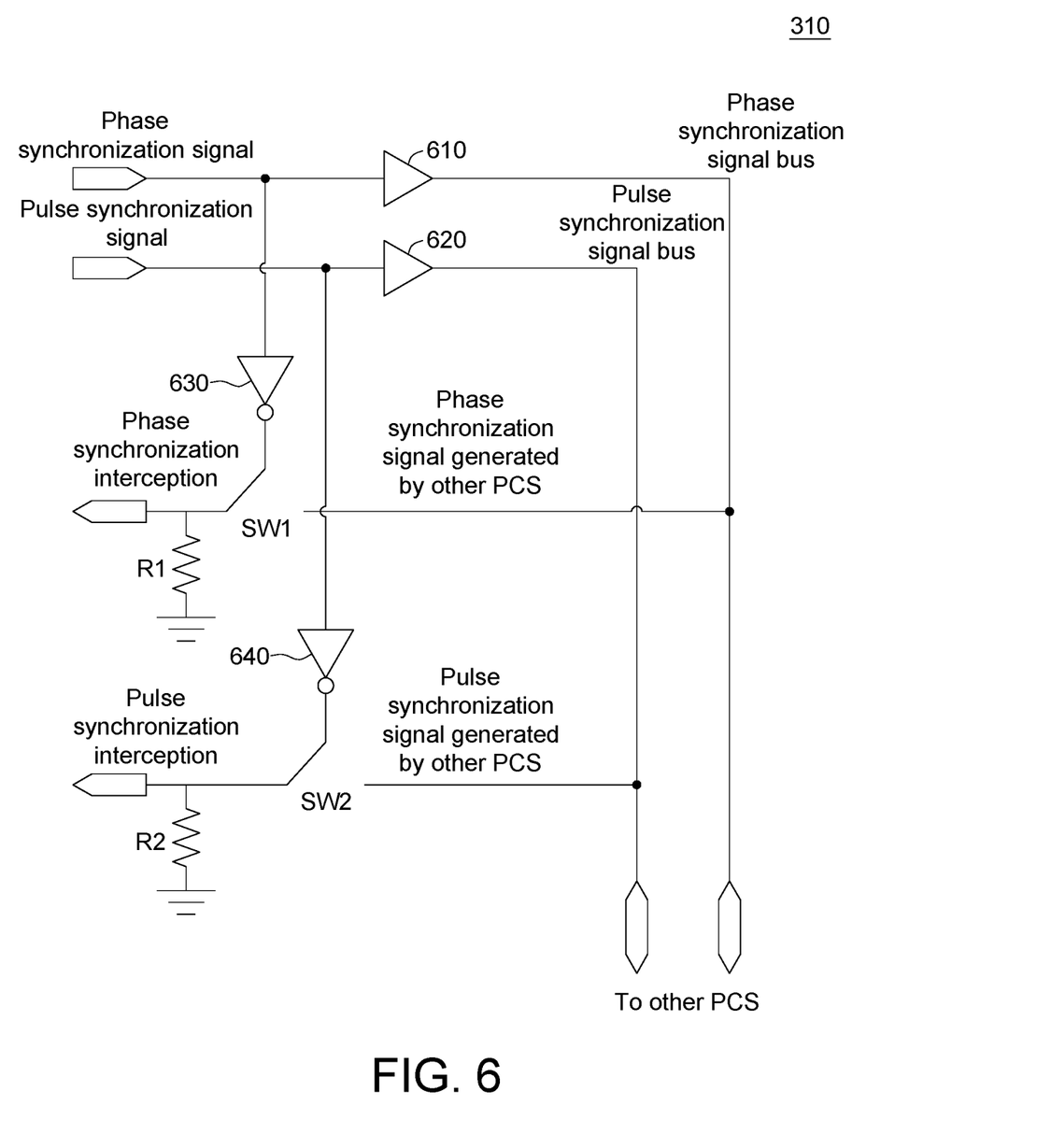
FIG. 6 is a schematic diagram of circuit embodiment of a synchronization control unit according to an embodiment of the application.

FIG. 6 is a schematic diagram of circuit embodiment of a synchronization control unit 310 according to an embodiment of the application. The synchronization control unit 310 includes buffers 610 and 620, phase inverters 630 and 640, switches SW1 and SW2, and resistors R1 and R2. The resistors R1 and R2 are coupled to the switches SW1 and SW2.

When the synchronization control unit 310 generates a phase synchronization signal and/or a pulse synchronization signal, if the phase synchronization signal bus 360 and/or the pulse synchronization signal bus 370 do not have other signal input, the phase synchronization signal and/or the pulse synchronization signal generated by the synchronization control unit 310 will be outputted to the phase synchronization signal bus 360 and/or the pulse synchronization signal bus 370 through the buffer 610 and/or the buffer 620 (here below, the phase synchronization signal bus 360 and the pulse synchronization signal bus 370 together are referred as the synchronization signal bus) and used as the master control signal of the synchronization control unit 310 for all PCSs 110 (can also be referred as system phase synchronization signal and/or system pulse synchronization signal). Meanwhile, the phase synchronization signal and/or the pulse synchronization signal generated by the synchronization control unit 310 cause the switch SW1 and/or the switch SW2 to be turned off through the phase inverter 630 and/or the phase inverter 640 and cause the phase synchronization intercept pin and/or the pulse synchronization intercept pin to drop to a low level, so that the corresponding synchronization control unit 310 will be prevented from receiving signal from the synchronization signal bus (the phase synchronization signal bus 360 and/or the pulse synchronization signal bus 370), and the corresponding synchronization control unit 310 obtains synchronization master control. When another synchronization control unit 310 generates a phase synchronization signal and/or a pulse synchronization signal (that is, system phase synchronization signal and/or system pulse synchronization signal) through the synchronization signal bus phase synchronization signal bus 360 and/or the pulse synchronization signal bus 370 earlier than the corresponding synchronization control unit 310, the system phase synchronization signal and/or the system pulse synchronization signal generated by the other synchronization control unit 310 will be inputted to the phase synchronization intercept pin and/or the pulse synchronization intercept pin, and the synchronization control unit 310 will use the system phase synchronization signal and/or system pulse synchronization signal generated by another synchronization control unit 310 as a benchmark of phase synchronization and/or pulse synchronization.

Figure 7:
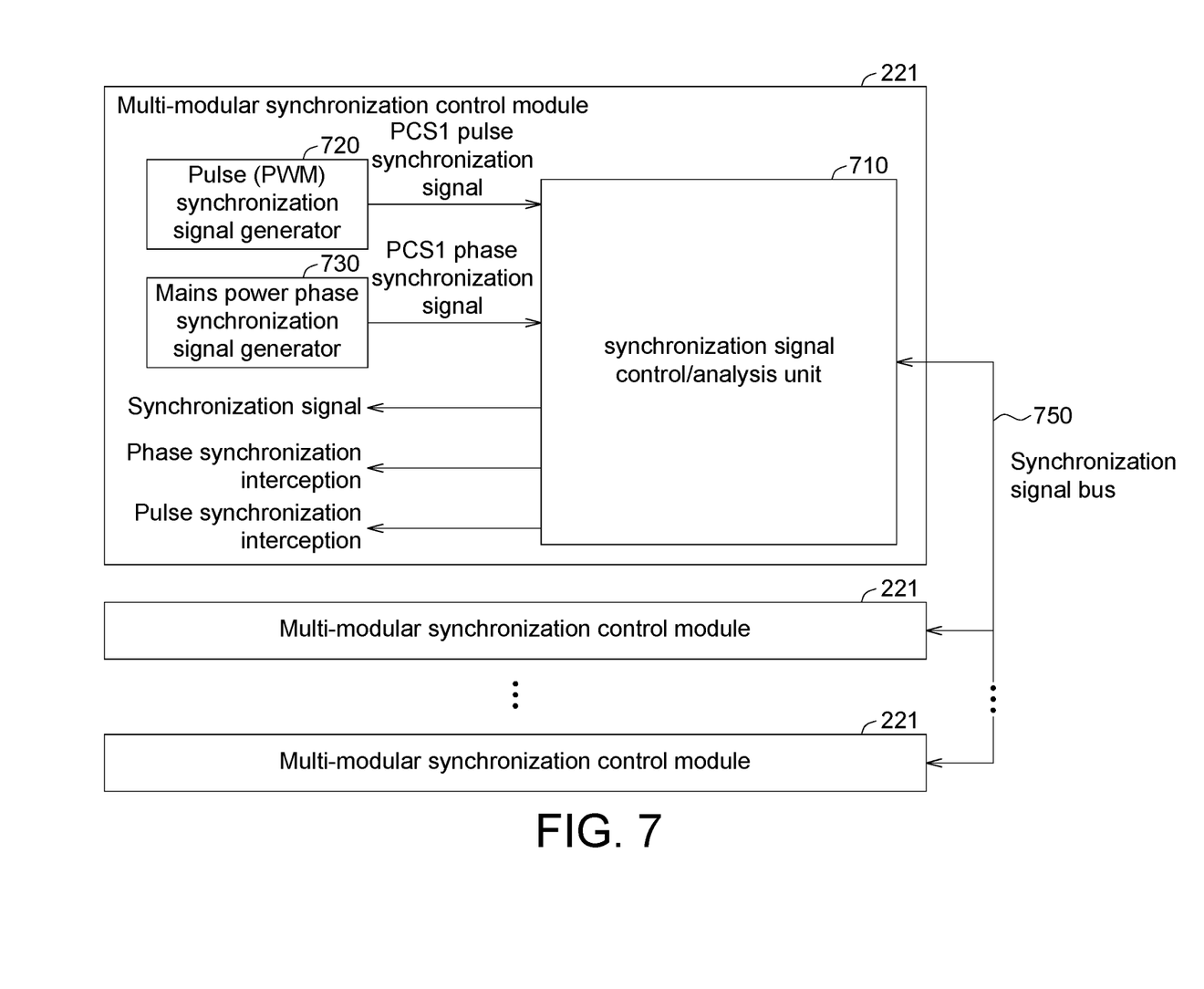
FIG. 7 is a schematic diagram of synchronization control implemented through a single line synchronization signal bus according to an embodiment of the application.

FIG. 7 is a schematic diagram of synchronization control implemented through a single line synchronization signal bus according to an embodiment of the application. Similarly, in FIG. 7, the multi-modular synchronization control module 221 according to an embodiment of the application includes a synchronization signal control/analysis unit 710, a pulse synchronization signal generator 720 and a mains power phase synchronization signal generator 730. The pulse synchronization signal generator 720 and the mains power phase synchronization signal generator 730 basically are identical or similar to the pulse synchronization signal generator 320 and the mains power phase synchronization signal generator 330 of FIG. 3.

In a multi-modular synchronization control module 221, the synchronization signal control/analysis unit 710, the pulse synchronization signal generator 720 and the mains power phase synchronization signal generator 730 are used to transmit/receive a phase synchronization signal and a pulse synchronization signal and perform the locking of the phase/pulse synchronization signal. The pulse synchronization signal generator 720 is used to calculate the pulse synchronization signal. The mains power phase synchronization signal generator 730 is used to calculate the mains power phase synchronization signal.

The synchronization signal control/analysis unit 710 is used to transmit and/or receive a synchronization control signal and analyze the transmitted and/or received synchronization signal as a phase synchronization signal and/or a pulse synchronization signal, then performs the locking of the phase synchronization signal and/or the locking of the pulse synchronization signal.

The operations of pulse synchronization and phase synchronization of the single synchronization signal bus according to an embodiment of the application are disclosed below. The pulse synchronization signal generator 720 calculates and generates a pulse synchronization signal. The mains power phase synchronization signal generator 730 calculates and generates a phase synchronization signal. The synchronization signal control/analysis unit 710 performs synchronization determination of the pulse signal and the phase signal. Before the pulse synchronization signal generator 720 and/or the mains power phase synchronization signal generator 730 outputs a pulse synchronization signal and/or the phase synchronization signal, if the synchronization signal bus 750 has already received and locked the pulse synchronization signal and/or the phase synchronization signal, then the synchronization signal control/analysis unit 710 determines that pulse synchronization and/or phase synchronization have been achieved.

Before the pulse synchronization signal generator 720 and/or the mains power phase synchronization signal generator 730 outputs a pulse synchronization signal and/or a phase synchronization signal, if no pulse synchronization signal and/or phase synchronization signal generated by other PCSs 110 are transmitted to the synchronization signal control/analysis unit 710 through the synchronization signal bus 750 and are locked, the synchronization signal control/analysis unit 710 determines that pulse synchronization and/or phase synchronization have not been locked. Meanwhile, the synchronization signal control/analysis unit 710 locks the pulse synchronization signal and/or the phase synchronization signal generated by itself as a benchmark of pulse/phase synchronization and outputs the pulse synchronization signal and/or the phase synchronization signal generated by itself to the synchronization signal bus 750, then the process terminates.

Figure 8:
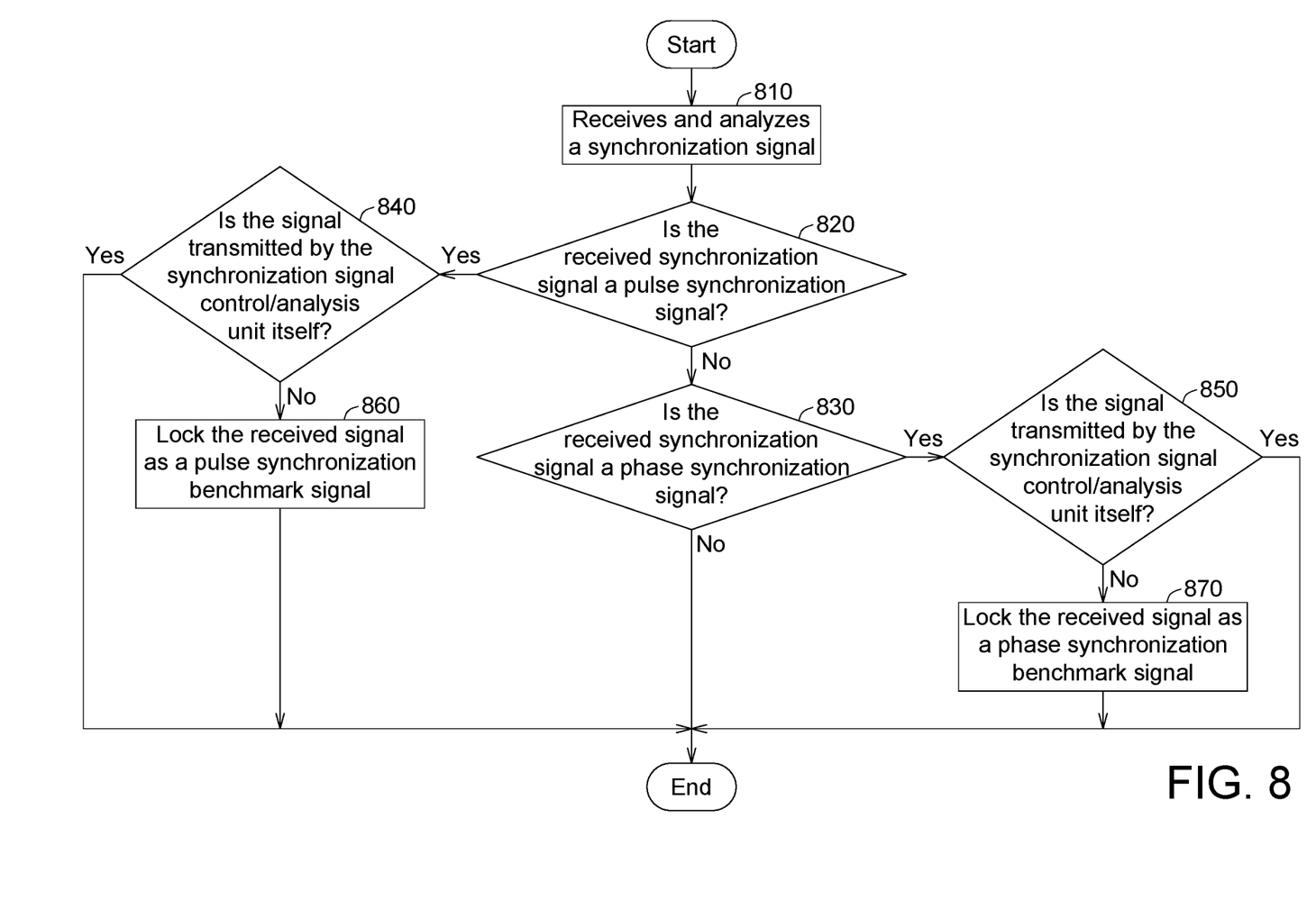
FIG. 8 is an operational flowchart of a pulse synchronization and phase synchronization of a single synchronization signal bus according to an embodiment of the application.

FIG. 8 is an operational flowchart of a pulse synchronization and phase synchronization of a single synchronization signal bus according to an embodiment of the application. In step 810, the synchronization signal control/analysis unit 710 receives and analyzes a synchronization signal, and determines whether the received synchronization signal is a pulse synchronization signal or a phase synchronization signal (step 820 and 830). If the received synchronization signal is a pulse synchronization signal, the synchronization signal control/analysis unit 710 determines whether the received synchronization signal is transmitted by itself (step 840). If the determination in step 840 is affirmative, the process terminates. If the received synchronization signal is not transmitted by the synchronization signal control/analysis unit 710 (the determination in step 840 is negative), the synchronization signal control/analysis unit 710 locks the received synchronization signal as a pulse synchronization benchmark signal (step 860) and transmits a pulse signal locked mark.

Similarly, if the received synchronization signal is a phase synchronization signal, the synchronization signal control/analysis unit 710 determines whether the received synchronization signal is transmitted by the synchronization signal control/analysis unit 710 itself (step 850). If the determination in step 850 is affirmative, the process terminates. If the received synchronization signal is not transmitted by the synchronization signal control/analysis unit 710 itself (the determination in step 850 is negative), the synchronization signal control/analysis unit 710 locks the received synchronization signal as a phase synchronization benchmark signal (step 870) and transmits a phase signal locked mark.

In an embodiment of the application, the sequence in determining whether the received synchronization signal is a pulse synchronization signal or a phase synchronization signal can be swapped. That is, whether the received synchronization signal is a phase synchronization signal is determined first, and whether the received synchronization signal is a pulse synchronization signal is determined later.

Figure 9:
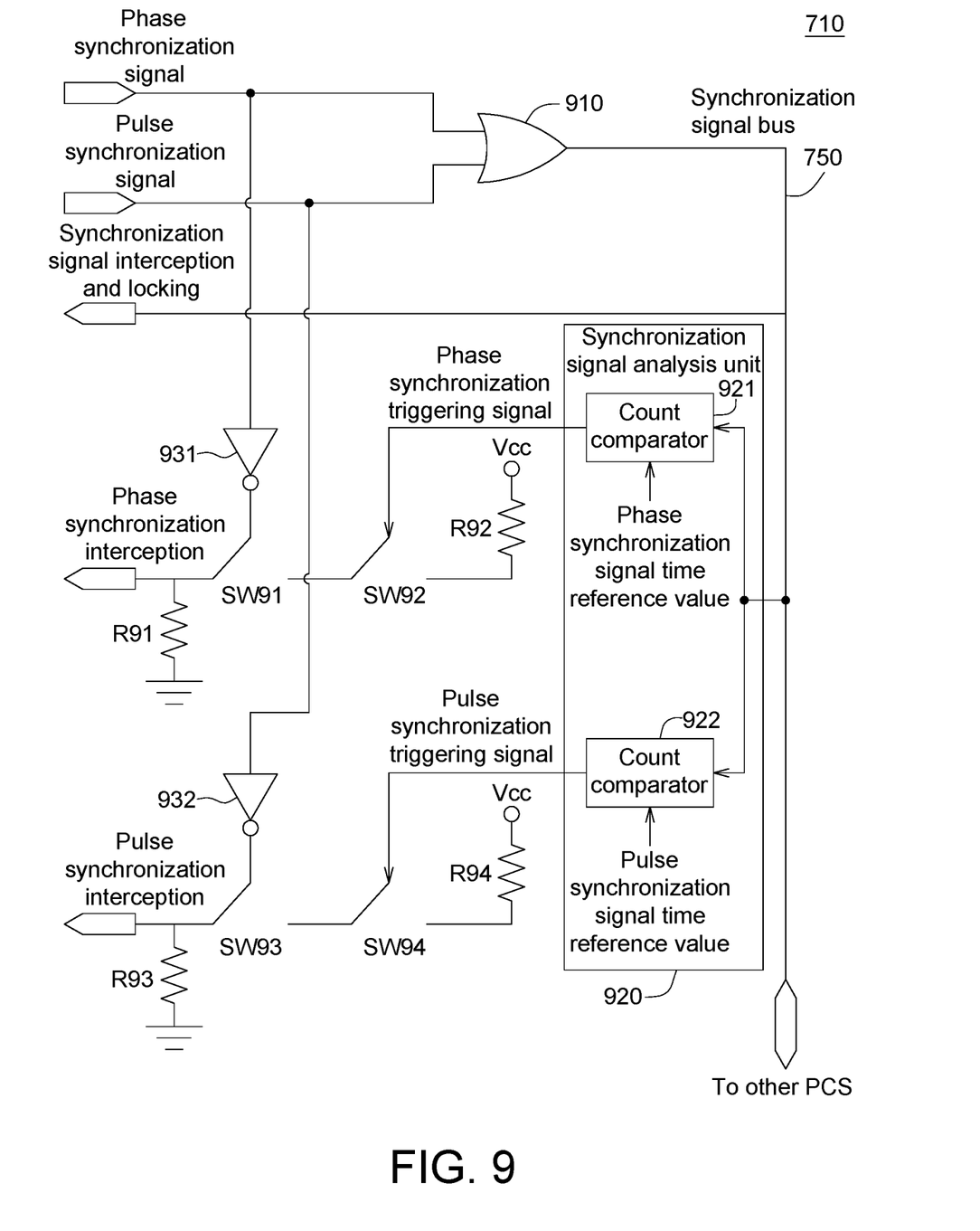
FIG. 9 is a circuit diagram of a synchronization signal control/analysis unit according to an embodiment of the application.

FIG. 9 is a circuit diagram of a synchronization signal control/analysis unit 710 according to an embodiment of the application. The synchronization signal control/analysis unit 710 includes an OR gate 910, a synchronization signal analysis unit 920, phase inverters 931 and 932, switches SW91-SW94, and resistors R91-R94. The resistors R91-R94 are coupled to the switches SW91-SW94. The synchronization signal analysis unit 920 further includes count comparators 921 and 922.

After the synchronization signal control/analysis unit 710 generates a phase synchronization signal and/or a pulse synchronization signal, the generated phase synchronization signal and/or pulse synchronization signal are inputted to the synchronization signal bus 750 through the OR gate 910 and the phase synchronization signal and/or the pulse synchronization signal generated by the synchronization signal control/analysis unit 710 are used as a system phase synchronization signal and/or a system pulse synchronization signal. Besides, the generated phase synchronization signal and/or the pulse synchronization signal cause the switch SW91 and/or the switch SW93 to be turned off through the phase inverters 931 and 932 and cause the phase synchronization intercept pin and/or the pulse synchronization intercept pin to drop to a low level, so that the synchronization signal control/analysis unit 710 will not receive the synchronization signal from the synchronization signal bus 750 and the corresponding synchronization signal control/analysis unit 710 will obtain synchronization master control.

If the corresponding synchronization signal control/analysis unit 710 receives a synchronization signal from other synchronization signal control/analysis unit 710, the synchronization signal control/analysis unit 710 loads in the received synchronization signal. The count comparators 921 and 922 perform signal analysis (counting and comparison) by referring to the phase synchronization signal time reference value and/or the pulse synchronization signal time reference value; after analysis is completed, count comparators 921 and 922 determine whether corresponding synchronization signal has been locked. If the corresponding synchronization signal has been locked, no action is performed. If the corresponding synchronization signal has not been locked, the synchronization signal analysis unit 920 outputs a phase synchronization triggering signal and/or a pulse synchronization triggering signal, turns on the corresponding switch SW92 and/or SW94 according to whether the synchronization signal is a phase synchronization signal or a pulse synchronization signal, and boosts the level of the phase synchronization intercept pin and/or the pulse synchronization intercept pin as a reference for determining which synchronization is triggered, so that the multi-modular synchronization control module 221 can make correct determination and lock the signal.

In an embodiment of the application, the multi-modular synchronization control module implemented by micro-controller unit (MCU) software can perform the generation and processing of synchronization signal to achieve the synchronization of phase/pulse signal between multiple multi-modular synchronization control modules. The single line synchronization signal bus or the double line synchronization signal bus (including phase synchronization signal bus and pulse synchronization bus) connects all of the multi-modular synchronization control modules to perform the transmission and reception of the pulse synchronization signal and the phase synchronization signal between the multi-modular synchronization control modules. The PCS parallel architecture equipped with a single line synchronization signal bus can also be referred as a single line synchronization signal bus architecture; and the PCS parallel architecture equipped with a double line synchronization signal bus can also be referred as a double line synchronization signal bus architecture.

In the double line synchronization signal bus architecture, each multi-modular synchronization control module includes a pulse synchronization signal generator used to calculate the pulse synchronization signal, a mains power phase synchronization signal generator used to calculate a mains power phase synchronization signal, and a synchronization signal control unit used to transmit/receive the synchronization signal and perform the locking of the phase/pulse synchronization signal.

During the operation of pulse synchronization: firstly, the pulse synchronization signal generator calculates and generates a pulse synchronization signal, and then the synchronization signal control unit performs synchronization determination of the pulse signal. Before the pulse synchronization signal generator outputs the pulse synchronization signal, if the pulse synchronization signal bus has already received the pulse synchronization signal and locked pulse synchronization, the synchronization signal control unit determines that pulse synchronization has been achieved, and the operation of pulse synchronization terminates. Before the pulse synchronization signal generator outputs the pulse synchronization signal, if no other pulse synchronization signals are transmitted to the synchronization signal control unit through the pulse synchronization signal bus and are locked, the synchronization signal control unit determines that pulse synchronization is not performed. Meanwhile, the synchronization signal control unit locks the pulse synchronization signal generated by itself as a benchmark of pulse synchronization and outputs the pulse synchronization signal generated by itself to the pulse synchronization signal bus, then the operation of pulse synchronization terminates.

During the operation of phase synchronization: the phase synchronization signal generator calculates and generates phase synchronization signal, then the synchronization signal control unit performs synchronization determination of the phase signal. Before the phase synchronization signal generator outputs a phase synchronization signal, if the phase synchronization signal bus has already received phase synchronization signal and locked phase synchronization, the synchronization signal control unit determines that phase synchronization has been achieved, and the operation of phase synchronization terminates. Before the phase synchronization signal generator outputs the phase synchronization signal, if no other phase synchronization signals are transmitted to the synchronization signal control unit through the phase synchronization signal bus and are locked, the synchronization signal control unit determines that phase synchronization is not performed. Meanwhile, the synchronization signal control unit locks the phase synchronization signal generated by itself as a benchmark of phase synchronization and outputs the phase synchronization signal generated by itself to the phase synchronization signal bus, then the operation of phase synchronization terminates.

When the synchronization signal control unit receives a pulse synchronization signal and/or a phase synchronization signal from the pulse synchronization signal bus and/or the phase synchronization signal bus, the process by which the synchronization signal control unit makes determination and locks pulse and/or phase synchronization is as follows. The synchronization signal control unit receives the pulse synchronization signal and/or the phase synchronization signal through the pulse synchronization signal bus and/or the phase synchronization signal bus and determines whether the received pulse synchronization signal and/or the phase synchronization signal are transmitted by the synchronization signal control unit itself. If the synchronization signal control unit determines that the pulse synchronization signal and/or the phase synchronization signal are transmitted by the synchronization signal control unit itself, the process terminates. If the synchronization signal control unit determines that the pulse synchronization signal and/or the phase synchronization signal are not transmitted by the synchronization signal control unit itself, the received pulse synchronization signal and/or the phase synchronization signal are locked as a benchmark signal of pulse synchronization and/or phase synchronization and a pulse signal locked mark and/or a phase signal locked mark are transmitted.

In the single line synchronization signal bus architecture, each multi-modular synchronization control module implemented by micro-controller unit (MCU) software can perform the generation, processing and analysis of synchronization signal to achieve the synchronization of phase/pulse signal between multiple multi-modular synchronization control modules.

In the single line synchronization signal bus architecture, the synchronization signal bus connects all of the multi-modular synchronization control modules to perform the transmission and reception of the pulse synchronization signal and the phase synchronization signal between the multi-modular synchronization control modules.

In the single line synchronization signal bus architecture, each multi-modular synchronization control module includes a pulse synchronization signal generator used to calculate the pulse synchronization signal; a mains power phase synchronization signal generator used to calculate the mains power phase synchronization signal; and a synchronization signal control/analysis unit used to transmit and receive the synchronization signal and analyze whether the transmitted or received synchronization signal is a phase synchronization signal or a pulse synchronization signal, then perform the locking of the phase/pulse synchronization signal.

In the single line synchronization signal bus architecture, the operation process of pulse synchronization and phase synchronization is as follows: The pulse synchronization signal generator and/or the phase synchronization n signal generator calculate and generate a pulse synchronization signal and/or a phase synchronization signal, then the synchronization signal control/analysis unit performs the judgment of pulse synchronization and/or phase synchronization.

In the single line synchronization signal bus architecture, before the pulse synchronization signal generator and/or the phase synchronization signal generator outputs the pulse synchronization signal and/or the phase synchronization signal, if the synchronization signal bus has already received the pulse synchronization signal and/or the phase synchronization signal and locked pulse synchronization and/or phase sync, the synchronization signal control/analysis unit determines that pulse synchronization and/or phase synchronization have been achieved, and the action directly terminates.

In the single line synchronization signal bus architecture, before the pulse synchronization signal generator and/or the phase synchronization signal generator outputs the pulse synchronization signal and/or the phase synchronization signal, if no other pulse synchronization signals and/or phase synchronization signals are transmitted to the synchronization signal control/analysis unit through the synchronization signal bus and are locked, the synchronization signal control/analysis unit determines that pulse synchronization and/or phase synchronization are not performed. Meanwhile, the synchronization signal control/analysis unit locks the pulse synchronization signal and/or the phase synchronization signal generated by the synchronization signal control/analysis unit itself as a benchmark of pulse synchronization and/or a benchmark of phase synchronization and outputs the pulse synchronization signal and/or the phase synchronization signal generated by the synchronization signal control/analysis unit itself to the synchronization signal bus, then the process terminates.

In the single line synchronization signal bus architecture, the synchronization signal control/analysis unit receives the synchronization signal then performs signal analysis and determines whether the received synchronization signal is a pulse synchronization signal or a phase synchronization signal. If it is determined that the received synchronization signal is a pulse synchronization signal, whether the received synchronization signal is transmitted by the synchronization signal control/analysis unit itself is further determined. If the received synchronization signal is transmitted by the synchronization signal control/analysis unit itself, then the process terminates. If the received synchronization signal is not transmitted by the synchronization signal control/analysis unit itself, the synchronization signal control/analysis unit locks the received synchronization signal as a benchmark of pulse synchronization and transmits a pulse signal locked mark.

In the single line synchronization signal bus architecture, the synchronization signal control/analysis unit receives the synchronization signal then performs signal analysis and determines whether the received synchronization signal is a pulse synchronization signal or a phase synchronization signal. If it is determined that the received synchronization signal is a phase synchronization signal, whether the received synchronization signal is transmitted by the synchronization signal control/analysis unit itself is further determined. If it is determined that the received synchronization signal is transmitted by the synchronization signal control/analysis unit itself, the process terminates. If the received synchronization signal is not transmitted by the synchronization signal control/analysis unit itself, the synchronization signal control/analysis unit locks the received synchronization signal as a benchmark of phase synchronization and transmits a phase signal locked mark.

In an embodiment of the application, the master control is obtained by the PCS (PCS controller) which transmits a earliest pulse synchronization signal or a earliest phase synchronization signal on the synchronization signal bus (whether single line or double line synchronization signal bus), and the synchronization signal transmitted by the PCS controller having master control is used as a system synchronization signal, and other PCS controllers not having the master control are synchronized with the system synchronization signal by referring to the system synchronization signal.

The present invention relates to a power conversion system (PCS) parallel architecture. With respect to the architecture including of a number of PCSs operating in parallel, a phase/pulse synchronization control method is provided. The phase/pulse synchronization control method enables the pulse width modulation (PWM) signal provided by the PCSs to be synchronized with an AC mains power signal and assures output synchronization for the PCSs. The application resolves the problems arising from the circular current and interference in the system and significantly increases system stability.

Although many specific details are described in the present application, these specific details should not be interpreted as restrictions of the scope of protection of the claims; rather, they should be regarded as descriptions of the features of specific implementations. In the application, a sub-combination of some features described in the context of a single embodiment can be implemented in one single embodiment. Conversely, various features described in the context of one single embodiment can be implemented in one or a suitable sub-combination of several embodiments. Initially, the descriptions may suggest that some features would function only when they are included in some combinations, and such combinations may even be specified. However, under some circumstances, one or some features can be deleted from the said combinations, which are related to one specific sub-combination or variations thereof. Similarly, although the operations of the method are illustrated in a specific order, it does not mean that these operations must be executed according to the illustrated order or that all illustrated operations must be executed in order to achieve desired results.

Although only some examples and implementations are disclosed in the above embodiments of the application, based on the disclosed contents, modifications, adjustments, and improvements can be made to the above examples, implementations, and other possible implementations.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power conversion system (PCS) parallel architecture, comprising: a plurality of PCSs electrically coupled to each other through a synchronization signal bus to achieve synchronization, the PCSs further individually coupled to an AC mains power and a DC power supply, respectively;

wherein each of the PCSs comprises a PCS controller,
among the PCS controllers, when a target PCS controller of the PCS controllers transmits a synchronization signal earliest on the synchronization signal bus to obtain master control, the synchronization signal transmitted from the target PCS controller having the master control is used as a system synchronization signal, and other PCS controllers not having the master control are synchronized with the system synchronization signal by referring to the system synchronization signal.

2. The PCS parallel architecture according to claim 1, wherein when the synchronization signal bus comprises a pulse synchronization signal bus and a phase synchronization signal bus, each of the PCS controllers comprises a multi-modular synchronization control module, the multi-modular synchronization control module comprising:
   a pulse synchronization signal generator used to calculate and generate a self-pulse synchronization signal;
   a phase synchronization signal generator used to calculate and generate a self-phase synchronization signal; and
   a synchronization signal control unit used to transmit and receive the synchronization signal and perform phase synchronization signal locking and pulse synchronization signal locking.

3. The PCS parallel architecture according to claim 2, wherein in pulse synchronization signal locking:
   the pulse synchronization signal generator calculates and generates the self-pulse synchronization signal;
   before the pulse synchronization signal generator outputs the self-pulse synchronization signal, when the pulse synchronization signal bus has already received a system pulse synchronization signal and pulse synchronization is locked, the multi-modular synchronization control module determines that pulse synchronization has been achieved; and
   before the pulse synchronization signal generator outputs the self-pulse synchronization signal, when no system pulse synchronization signal is transmitted to the synchronization signal control unit through the pulse synchronization signal bus and pulse synchronization is not locked, the multi-modular synchronization control module determines that pulse synchronization is not achieved; and the synchronization signal control unit locks the self-pulse synchronization signal as a benchmark of pulse synchronization and outputs the self-pulse synchronization signal to the pulse synchronization signal bus.

4. The PCS parallel architecture according to claim 2, wherein in phase synchronization signal locking:
   the phase synchronization signal generator calculates and generates the self-phase synchronization signal;
   before the phase synchronization signal generator outputs the self-phase synchronization signal, when the phase synchronization signal bus has already received a system phase synchronization signal and phase synchronization is locked, the multi-modular synchronization control module determines that phase synchronization has been achieved; and
   before the phase synchronization signal generator outputs the self-phase synchronization signal, when no system phase synchronization signal is transmitted to the synchronization signal control unit through the phase synchronization signal bus and phase synchronization is not locked, the multi-modular synchronization control module determines that phase synchronization is not achieved; and the synchronization signal control unit locks the self-phase synchronization signal as a benchmark of phase synchronization and outputs the self-phase synchronization signal to the phase synchronization signal bus.

5. The PCS parallel architecture according to claim 2, wherein the synchronization signal control unit further receives a first pulse synchronization signal and/or a first phase synchronization signal through the pulse synchronization signal bus and/or the phase synchronization signal bus and determines whether the received first pulse synchronization signal and/or the received first phase synchronization signal are transmitted from the synchronization signal control unit;
   when the received first pulse synchronization signal and/or the received first phase synchronization signal are transmitted from the synchronization signal control unit, no action is taken;
   when the received first pulse synchronization signal and/or the received first phase synchronization signal are not transmitted from the synchronization signal control unit, the synchronization signal control unit locks the received first pulse synchronization signal and/or the received first phase synchronization signal as a pulse synchronization benchmark signal and/or a phase synchronization benchmark signal and transmits a pulse signal locked mark and/or a phase signal locked mark.

6. The PCS parallel architecture according to claim 1, wherein when the synchronization signal bus comprises a single synchronization signal bus, each of the PCS controllers comprises a multi-modular synchronization control module comprising:
   a pulse synchronization signal generator used to calculate and generate a self-pulse synchronization signal;
   a phase synchronization signal generator used to calculate and generate a self-phase synchronization signal; and
   a synchronization signal control/analysis unit used to transmit and receive a synchronization signal and analyze whether the transmitted or received synchronization signal is a phase synchronization signal or a pulse synchronization signal, and performs phase synchronization signal locking and pulse synchronization signal locking.

7. The PCS parallel architecture according to claim 6, wherein the pulse synchronization signal generator and/or the phase synchronization signal generator calculates and generates the self-pulse synchronization signal and/or the self-phase synchronization signal, the synchronization signal control/analysis unit performs judgment of pulse synchronization and/or phase synchronization.

8. The PCS parallel architecture according to claim 6, wherein
   before the pulse synchronization signal generator and/or the phase synchronization signal generator outputs the self-pulse synchronization signal and/or the self-phase synchronization signal, when the synchronization signal bus has already received a first pulse synchronization signal and/or a first phase synchronization signal and pulse synchronization and/or phase synchronization are locked, the multi-modular synchronization control module determines that pulse synchronization and/or phase synchronization have been achieved;
   before the pulse synchronization signal generator and/or the phase synchronization signal generator outputs the self-pulse synchronization signal and/or the self-phase synchronization signal, when the first pulse synchronization signal and/or the first phase synchronization signal are transmitted to the synchronization signal control/analysis unit through the synchronization signal bus and no phase and/or pulse synchronization are locked, the multi-modular synchronization control module determines that pulse synchronization and/or phase synchronization are not achieved, the synchronization signal control/analysis unit locks the self-pulse synchronization signal and/or the self-phase synchronization signal as a benchmark of pulse synchronization and/or a benchmark of phase synchronization and outputs the self-pulse synchronization signal and/or the self-phase synchronization signal to the synchronization signal bus.

9. The PCS parallel architecture according to claim 6, wherein when the synchronization signal received by the synchronization signal control/analysis unit is the pulse synchronization signal, the synchronization signal control/analysis unit determines whether the received synchronization signal is transmitted by the synchronization signal control/analysis unit itself; when the synchronization signal control/analysis unit determines that the received synchronization signal is not transmitted by the synchronization signal control/analysis unit itself, the synchronization signal control/analysis unit locks the received synchronization signal as a benchmark of pulse synchronization and transmits a pulse signal locked mark; and when the received synchronization signal is the phase synchronization signal, the synchronization signal control/analysis unit determines whether the received synchronization signal is transmitted by the synchronization signal control/analysis unit itself; when the synchronization signal control/analysis unit determines that the received synchronization signal is not transmitted by the synchronization signal control/analysis unit itself, the synchronization signal control/analysis unit locks the received synchronization signal as a benchmark of phase synchronization and transmits a phase signal locked mark.

10. A synchronization control method of a power conversion system (PCS) parallel architecture, the PCS parallel architecture comprising a plurality of PCSs electrically coupled to each other through a synchronization signal bus to achieve synchronization, each of the PCSs comprises a PCS controller used to execute the synchronization control method:

among the PCS controllers, when a target PCS controller of the PCS controllers transmits a synchronization signal earliest on the synchronization signal bus to obtain master control, the synchronization signal transmitted from the target PCS controller having the master control is used as a system synchronization signal, and other PCS controllers not having the master control are synchronized with the system synchronization signal by referring to the system synchronization signal.

11. The synchronization control method of a PCS parallel architecture according to claim 10, wherein when the synchronization signal bus comprises a pulse synchronization signal bus and a phase synchronization signal bus, each of the PCS controllers comprises a multi-modular synchronization control module, the multi-modular synchronization control module comprising:

a pulse synchronization signal generator used to calculate and generate a self-pulse synchronization signal;

a phase synchronization signal generator used to calculate and generate a self-phase synchronization signal; and a synchronization signal control unit used to transmit and receive the synchronization signal and perform phase synchronization signal locking and pulse synchronization signal locking.

12. The synchronization control method of a PCS parallel architecture according to claim 11, wherein in pulse synchronization signal locking:

the pulse synchronization signal generator calculates and generates the self-pulse synchronization signal;

before the pulse synchronization signal generator outputs the self-pulse synchronization signal, when the pulse synchronization signal bus has already received a system pulse synchronization signal and pulse synchronization is locked, the multi-modular synchronization control module determines that pulse synchronization has been achieved; and before the pulse synchronization signal generator outputs the self-pulse synchronization signal, when no system pulse synchronization signal is transmitted to the synchronization signal control unit through the pulse synchronization signal bus and pulse synchronization is not locked, the multi-modular synchronization control module determines that pulse synchronization is not achieved; and the synchronization signal control unit locks the self-pulse synchronization signal as a benchmark of pulse synchronization and outputs the self-pulse synchronization signal to the pulse synchronization signal bus.

13. The synchronization control method of a PCS parallel architecture according to claim 11, wherein in phase synchronization signal locking:

the phase synchronization signal generator calculates and generates the self-phase synchronization signal;

before the phase synchronization signal generator outputs the self-phase synchronization signal, when the phase synchronization signal bus has already received a system phase synchronization signal and phase synchronization is locked, the multi-modular synchronization control module determines that phase synchronization has been achieved; and before the phase synchronization signal generator outputs the self-phase synchronization signal, when no system phase synchronization signal is transmitted to the synchronization signal control unit through the phase synchronization signal bus and phase synchronization is not locked, the multi-modular synchronization control module determines that phase synchronization is not achieved; and the synchronization signal control unit locks the self-phase synchronization signal as a benchmark of phase synchronization and outputs the self-phase synchronization signal to the phase synchronization signal bus.

14. The synchronization control method of a PCS parallel architecture according to claim 11, wherein the synchronization signal control unit further receives a first pulse synchronization signal and/or a first phase synchronization signal through the pulse synchronization signal bus and/or the phase synchronization signal bus and determines whether the received first pulse synchronization signal and/or the received first phase synchronization signal are transmitted from the synchronization signal control unit;

when the received first pulse synchronization signal and/or the received first phase synchronization signal are transmitted from the synchronization signal control unit, no action is taken;

when the received first pulse synchronization signal and/or the received first phase synchronization signal are not transmitted from the synchronization signal control unit, the synchronization signal control unit locks the received first pulse synchronization signal and/or the received first phase synchronization signal as a pulse synchronization benchmark signal and/or a phase synchronization benchmark signal and transmits a pulse signal locked mark and/or a phase signal locked mark.

15. The synchronization control method of a PCS parallel architecture according to claim 10, wherein when the synchronization signal bus comprises a single synchronization signal bus, each of the PCS controllers comprises a multi-modular synchronization control module comprising:

a pulse synchronization signal generator used to calculate and generate a self-pulse synchronization signal;

a phase synchronization signal generator used to calculate and generate a self-phase synchronization signal; and a synchronization signal control/analysis unit used to transmit and receive a synchronization signal and analyze whether the transmitted or received synchronization signal is a phase synchronization signal or a pulse synchronization signal, and performs phase synchronization signal locking and pulse synchronization signal locking.

16. The synchronization control method of a PCS parallel architecture according to claim 15, wherein the pulse synchronization signal generator and/or the phase synchronization signal generator calculates and generates the self-pulse synchronization signal and/or the self-phase synchronization signal, the synchronization signal control/analysis unit performs judgment of pulse synchronization and/or phase synchronization.

17. The synchronization control method of a PCS parallel architecture according to claim 15, wherein before the pulse synchronization signal generator and/or the phase synchronization signal generator outputs the self-pulse synchronization signal and/or the self-phase synchronization signal, when the synchronization signal bus has already received a first pulse synchronization signal and/or a first phase synchronization signal and pulse synchronization and/or phase synchronization are locked, the multi-modular synchronization control module determines that pulse synchronization and/or phase synchronization have been achieved;

before the pulse synchronization signal generator and/or the phase synchronization signal generator outputs the self-pulse synchronization signal and/or the self-phase synchronization signal, when the first pulse synchronization signal and/or the first phase synchronization signal are transmitted to the synchronization signal control/analysis unit through the synchronization signal bus and no phase and/or pulse synchronization are locked, the multi-modular synchronization control module determines that pulse synchronization and/or phase synchronization are not achieved, the synchronization signal control/analysis unit locks the self-pulse synchronization signal and/or the self-phase synchronization signal as a benchmark of pulse synchronization and/or a benchmark of phase synchronization and outputs the self-pulse synchronization signal and/or the self-phase synchronization signal to the synchronization signal bus.

18. The synchronization control method of a PCS parallel architecture according to claim 15, wherein when the synchronization signal received by the synchronization signal control/analysis unit is the pulse synchronization signal, the synchronization signal control/analysis unit determines whether the received synchronization signal is transmitted by the synchronization signal control/analysis unit itself; when the synchronization signal control/analysis unit determines that the received synchronization signal is not transmitted by the synchronization signal control/analysis unit itself, the synchronization signal control/analysis unit locks the received synchronization signal as a benchmark of pulse synchronization and transmits a pulse signal locked mark; and when the received synchronization signal is the phase synchronization signal, the synchronization signal control/analysis unit determines whether the received synchronization signal is transmitted by the synchronization signal control/analysis unit itself; when the synchronization signal control/analysis unit determines that the received synchronization signal is not transmitted by the synchronization signal control/analysis unit itself, the synchronization signal control/analysis unit locks the received synchronization signal as a benchmark of phase synchronization and transmits a phase signal locked mark.

* * * * *